United States Patent Office 3,050,950
Patented Aug. 28, 1962

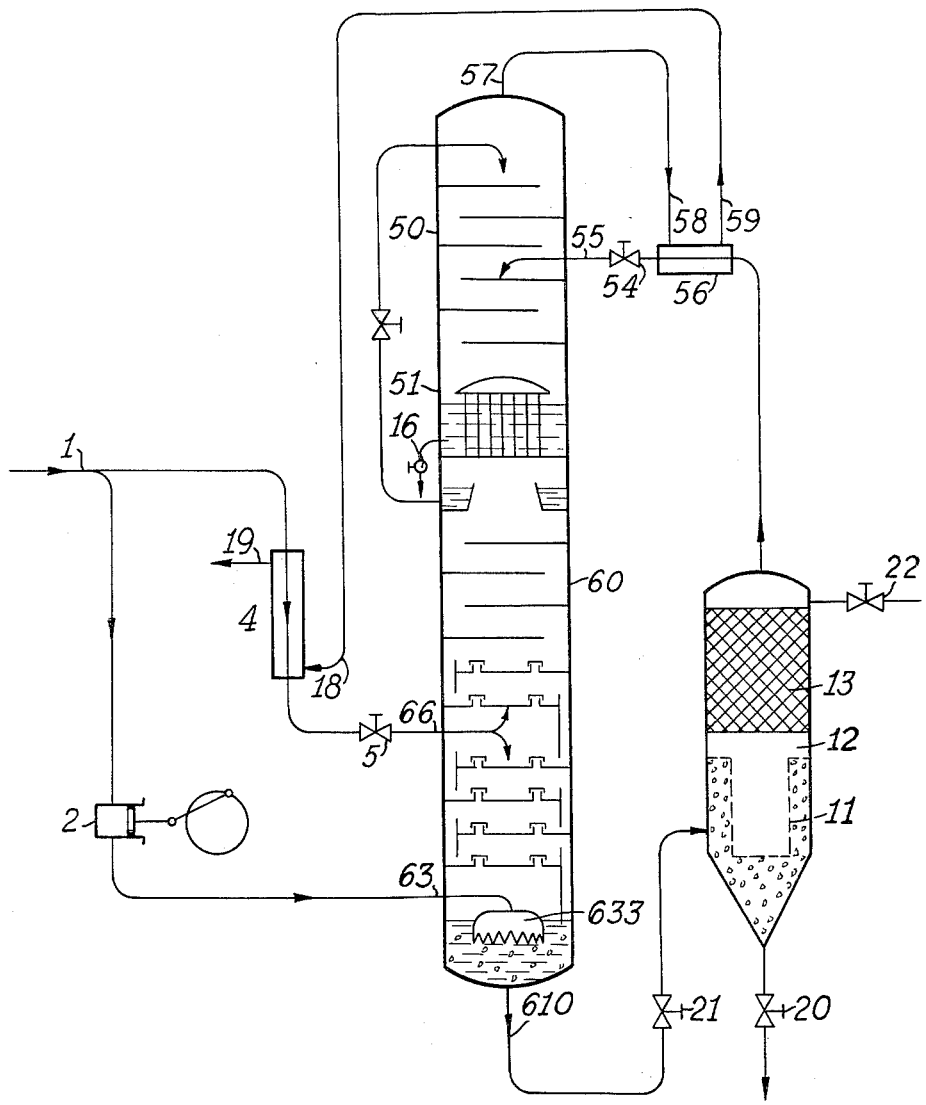

3,050,950
PROCESS FOR THE SEPARATION OF SOLID CARBON DIOXIDE FROM AIR AS IT DECOMPOSES IN WHICH THE CARBON DIOXIDE CONTAINING AIR IS PREVIOUSLY COOLED BELOW THE SOLIDIFICATION TEMPERATURE OF THE CARBON DIOXIDE
Ernst Karwat and Josef Weishaupt, Pullach, and Jakob Oberpriller, Buchenhain, Germany, assignors to Gesellschaft für Linde's Eismaschinen Aktiengesellschaft, Hollriegelskreuth, near Munich, Germany, a German company
Filed Aug. 31, 1960, Ser. No. 53,221
1 Claim. (Cl. 62—13)

The present invention relates to the art of separating air into its components by pressure and cooling, and is concerned with specific improvements in separating carbon dioxide in solid state from air during fractionating of the latter.

Germany Patent No. 1,044,127 describes a process for removing solid carbon dioxide from air during the fractionation thereof by compression and cooling. The process of said patent comprises providing a first stream of said air, expanding said first stream with production of external work, whereby carbon dioxide condenses and is entrained by the gas as snow; providing a second stream of air; liquefying part of it by cooling and throttling, the carbon dioxide being precipitated in this liquid as snow; washing said first stream with a mixture of the liquefied part of the second stream and rectification liquid obtained by rectifying the gaseous first stream and the gaseous part of the second stream in the high pressure column of a two-stage rectifier and simultaneously washing the liquid part of the second stream with said rectification liquid, suspending thus all the carbon dioxide in the liquid, cleaning said liquid by filtration and adsorption and leading it into the low-pressure stage of the two-column rectifier. This is based on the condition that the temperature of the highly compressed air prior to passage through the throttle valve must lie a few degrees above the temperature at which solid $CO_2$ is separated.

In the known process, this is attained by the fact that a sufficient amount of air is sent to meet the nitrogen to be heated, coming from the rectification column, so that the air is cooled down only so far as to fulfill the above-mentioned condition. This means, however, that less air goes to the expansion machine than in the usual case of processing air free of $CO_2$. Compared with this conventional procedure, the cold output is decreased and the result is that a part of the oxygen produced can be recovered only in gas form instead of liquid.

The present invention is addressed to the problem of overcoming the said disadvantage in the processing of air containing $CO_2$, and thereby making the process much more profitable.

The invention is based on the surprising finding that while a temperature—prior to throttling—up to 10° C. below the separation temperature is certain to lead to a clogging of the throttle valve with solid carbon dioxide, with a temperature 10 to 20° C. below this separation temperature such clogging is prevented and there is no disturbance of the valve.

The present invention, accordingly, is characterized by the fact that the part of the highly compressed air flowing to the throttle valve is cooled to 10 to 20° C. below the temperature at which the separation of solid carbon dioxide from the highly compressed air begins.

Since the amount of air to be conducted to the throttle valve may now be colder, this amount of air becomes smaller, while the amount of air to be expanded in the expansion machine becomes greater. The distribution of the two streams of air resembles the distribution in the conventional process of working with air which is free of $CO_2$ in its favorable high cold content and high yield in liquid oxygen. At the same time the advantage of the known process for the working of air containing $CO_2$, namely, that the removal of $CO_2$ with alkali is eliminated, is retained in the process according to this invention.

The accompanying drawing illustrates diagrammatically one arrangement of an apparatus for carrying out the process of the invention. One thousand normal cubic meters (i.e. cubic meters at 1 atm. pressure and 0° C.) (35,300 normal cubic feet, N cu. ft.) of carbon dioxide-containing air, after compression to 200 atm. and pre-cooling to —30° C. are divided at 1 into a first stream of 700 Nm.$^3$ (24,710 N cu. ft.) and a second stream of 300 Nm.$^3$ (10,590 N cu. ft.). The first stream passes to the expansion machine 2, where the air undergoes work-performing expansion, through which the temperature drops to about —160° C. to —170° C., and is introduced at 63 into the high pressure column 60 of a two stage rectifying device. This air contains about 330 Ncm.$^3$ carbon dioxide per Nm.$^3$ air in the form of carbon dioxide snow (0.57 Normal cubic inch of carbon dioxide per Normal cubic foot of air). The second stream of the high pressure air is cooled in the heat exchanger 4, by means of cold nitrogen, to approximately —170° C.; this air is then expanded in the throttle valve 5 to about 5.5 atm. and introduced, most of it in liquid from, at 66 into the high pressure column 60. Between the two inlets 63 and 66 of the pressure column as well as at the inlet of the throttle liquid are arranged bell plates in the construction of which provision is made to prevent the accumulation of solid carbon dioxide. The carbon dioxide conducted through pipes 66 and 63 is washed out by the liquid entering from the upper part of column 60. The gas which is freed from carbon dioxide rises in the column and is rectified therein. The liquid in which all the carbon dioxide from the air is suspended as snow, accumulates in the sump of the column. A toothed hood 633 connected to the pipe entering from the exhaust of the expansion machine dips its teeth into the surface of the sump liquid. This toothed hood causes moistening of the carbon dioxide snow with liquid, and the sedimentation there of most of the snow. The rest of the carbon dioxide is entrained by the liquid, trickling down over the plates.

The liquid in the high pressure column is removed at the lower end of the column at 610 and led to the filter 11, e.g. a metal frit i.e., sieve-like porous metallic plate, where the solid carbon dioxide is retained. After passing through the filter the liquid contains at 12 for example about 20 to 30 p.p.m, (parts per million) carbon dioxide. This is removed from the solution by adsorption on a layer of silica gel 13. Two sets of filter-adsorbers 11 to 13 are provided and are interchangeable. The purified liquid now contains only 0.1 to 0.5 p.p.m. $CO_2$. This liquid is cooled down to about 10° C. in the heat exchanger 56 by means of nitrogen entering from the head 57 of the upper column 50 through line 58, leaving through line 59, and is expanded with valve 54 and passed at 55 into the upper column 50. The temperature of the nitrogen rises thereby about 18° C. to 177° C.

Approximately 200 Nm.$^3$ (7,060 N. cu. ft.) liquid oxygen can be withdrawn from the upper column 50 at 16, and 2 Nm,$^3$ (70.6 N. cu. ft.) of gaseous oxygen at 51. 796 Nm.$^3$ (28,100 N. cu. ft.) gaseous nitrogen containing 0.9% oxygen is withdrawn from the head of column 50 at 57, is first warmed in heat exchanger 56, enters heat exchanger 4 at 18 where it cools the high pressure air to be throttled, thereby raising its own temperature, and leaves at 19.

The technical device shown in the drawing is an essentially familiar technique of air-separation; however, its employment here is novel. The invention does away with the false assumption that air containing carbon dioxide may be processed only if the temperature of the air before it enters the throttle valve is higher than the solidification temperature of the carbon dioxide. By means of the described distribution of the air into the two partial streams, the high-pressure air is cooled before the throttle valve to a temperature 10° C.–20° C. below that temperature at which the solidification of carbon dioxide begins.

If, when filtering the solid carbon dioxide from the high pressure column liquid, a layer of solid carbon dioxide is formed on the outside of the filter, the flow resistance increases with the thickness of the layer. In order to keep the quantity of filtered liquid and thereby the level of the liquid in the sump of the high pressure column constant, it is necessary to regulate the amount of the liquid with valve 54. If this is not done, the level of the sump liquid will rise in the column 60. Changing filter resistance disturbs the operation. In order to prevent this, the carbon dioxide in the liquid fed to the filter vessel is enriched to a consistency just barely fluid; in addition, a filter of high permeability is used. These two measures have several advantages: first, the pressure drop of the liquid passing through the filter remains small, eliminating the necessity of regulating valve 54; secondly, the snow can be removed from the filter vessel extremely easily and quickly, as will be discussed later.

The filtrate then contains about 3 to 5 times as much carbon dioxide as a saturated solution, e.g. 20 to 40 p.p.m. carbon dioxide. For the final purification of the filtrate with an adsorbent such as silica gel, more gel is required than for the purification of liquid filtered in the normal manner, usually at least 0.4 kg. silica gel per 1000 Nm.$^3$ of processed air (0.4 oz. silica gel per 1000 N. cu. ft. of processed air). The increase of the supply of gel becomes, however, irrelevant compared to the resulting advantage, because of this increase, of an exceptionally good removal of the acetylene from the high pressure liquid. The amount of gel used is namely ten times as great as is usually for the adsorption of acetylene from the high pressure column liquid. Acetylene is thus removed completely, particularly since it is fixed much more firmly by the gel than carbon dioxide; even carbon dioxide already adsorbed is forced out of the gel. Thus the measures employed also protect the air separator effectively against acetylene explosions.

If the carbon dioxide snow in the high pressure column liquid fed to the filter vessel is not enriched further than to the consistency of a barely fluid mixture and is drained from the filter vessel, after valves 54 and 21 are closed and pressure is relieved by means of valve 22, more than 90% of the snow in the filter vessel is removed in the shortest possible time. A small amount of dry carbon dioxide-free nitrogen led from valve 22 over the layer of gel 13 and then out through filter 11 and valve 20, is sufficient to render both the adsorber and the filter useable again. After the supernatant liquid nitrogen-oxygen mixture has evaporated from the drained mixture, solid carbon dioxide remains in a slightly lumpy form. It contains all the oil constituents which may have been carried along from the expansion machine, but is nevertheless quite suitable for cooling purposes. In the conventional method of evaporating with nitrogen the entire quantity of carbon dioxide within the filter vessel, the oil is enriched in the filter vessel to an inadmissible degree. The new purification method eliminates this disadvantage.

We claim:

A process for removing solid carbon dioxide from air during the fractionation thereof by compression and cooling, which comprises providing a first stream of said air, expanding said first stream with production of external work, whereby carbon dioxide condenses and is entrained by the gas as snow; providing a second stream of air, cooling it to a temperature which is 10 to 20° C. below the temperature at which the separation of solid $CO_2$ begins and liquefying part of it by throttling, the carbon dioxide being precipitated in this liquid as snow; washing said first stream with a mixture of the liquefied part of the second stream and liquid obtained by rectifying the gaseous first stream and the gaseous part of said second stream in the high pressure column of a two-stage rectifier, suspending thus all the carbon dioxide in the liquid mixture, cleaning said liquid mixture by filtration and adsorption and leading it into the low-pressure stage of the two-column rectifier.

References Cited in the file of this patent

UNITED STATES PATENTS

| | | |
|---|---|---|
| 2,411,680 | Dennis | Nov. 26, 1946 |
| 2,572,933 | Houvener | Oct. 30, 1951 |